T. W. PLUM.
SIPHON FAUCET.
No. 75,191. Patented Mar. 3, 1868.
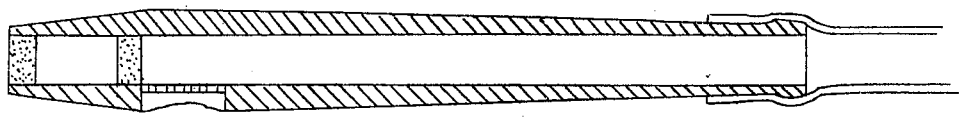
Fig. 1.
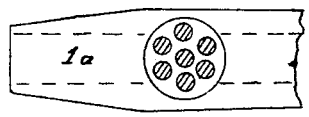
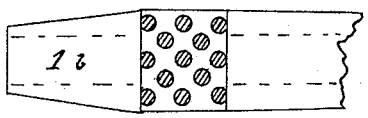
Fig. 2.
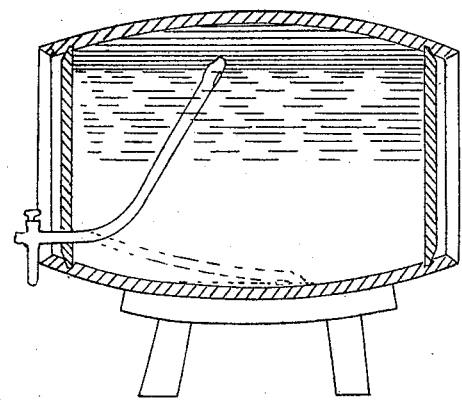
Fig. 3.
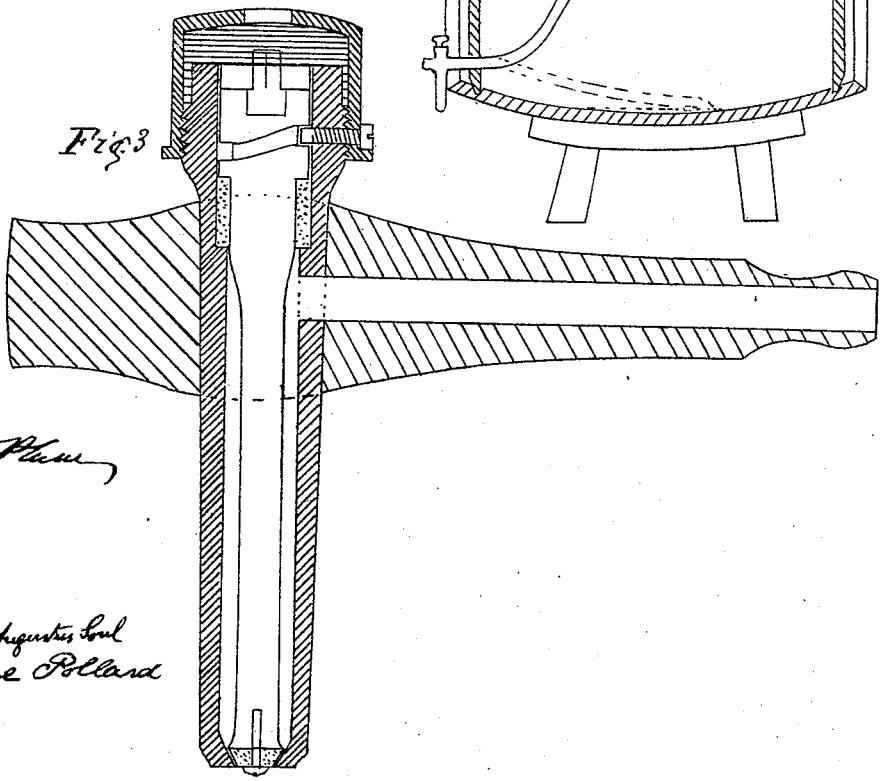

United States Patent Office.

THOMAS W. PLUM, OF LONDON, ENGLAND.

*Letters Patent No. 75,191, dated March 3, 1868.*

---

IMPROVEMENT IN SIPHON-FAUCETS.

---

The Schedule referred to in these Letters Patent and making part of the same.

---

TO ALL WHOM IT MAY CONCERN:

Be it known that I, THOMAS W. PLUM, of the city of London, England, have invented a new and improved Siphon-Tap, or apparatus for drawing liquids from casks and other vessels; and I do hereby declare the following to be a full and exact description thereof, reference being had to the accompanying drawings, forming a part of this specification, in which—

Figure 1 illustrates the manner of constructing the end of the buoyant tube of my apparatus.

Figure 2, my siphon-tap as inserted in a cask of liquid.

Figure 3, a section through the tap centrally, illustrating one form of constructing the fixed stationary portion thereof.

The nature of my invention consists of a tap or cock for drawing liquid from vessels, so constructed as that the liquid shall flow out from the vessel from its surface until entirely discharged, and be drained to the very bottom of the vessel, whatever its form.

My apparatus consists of a tap having its discharging-aperture so situated as that when the inner arm of the tap is properly inserted in the vessel, said aperture shall be in a plane below the lowermost point in the vessel; and whose inner end is provided with a flexible tube, buoyed at its free open end so as to float on the surface of the liquid.

In the accompanying drawings, fig. 3 illustrates one form of the fixed portion of my improved tap. The liquid flowing freely into the tap from its inner end or arm, inserted into the side or end of the vessel to be tapped, is not shut or "closed" off until it reaches the very end of the discharging-spout. This spout is so extended as that when the inner end or arm of the tap is inserted into the vessel, near the bottom thereof, the lower end of this discharging-spout shall be entirely below the said bottom, as illustrated in fig. 2. To the inner end or arm of the tap so constructed, I secure a flexible tube, as shown in fig. 2, and I impart buoyancy to the free open end of this tube by attaching thereto a float of wood, cork, or other material, or by forming a confined air-space therein, as shown in fig. 1. Ordinarily I contemplate forming the inlet-opening of the tube upon one side thereof, sufficiently removed from the buoyed end as to insure its being always under the surface of the liquid, and I protect the opening by a suitable strainer, when it is necessary.

With ordinary siphons for discharging liquids, the liquid is drawn from the bottom of the vessel, in its thickest and most sedimentary portion, unless great care be taken to hold the inner leg thereof near the surface, and to keep it there as the liquid flows out. In ordinary taps or cocks the liquid is necessarily drawn from the bottom, carrying in its outflow all sediment which may have collected there, and where, as is usual in all casks, the centre is lower than the ends when the cask is supported longitudinally, the entire amount of liquid cannot be drawn with such taps without removing the tap wholly and tilting up the cask. My invention provides a self-acting siphon-tap, by means of which the clearest portion of the liquid is always drawn first, until the entire contents of the vessel are discharged, and which will produce an entire discharge thereof through the tap without agitation of the vessel, and without the necessity of tilting the same.

What I claim as new in this my invention, and desire to secure by Letters Patent, is—

A tap or cock so constructed as that its discharging-aperture may be opened and closed below the level of the bottom of the cask or vessel into which it is inserted, and whose inner end consists of or terminates in a floating flexible tube, all substantially in the manner and for the purpose herein set forth.

THOS. W. PLUM.

Witnesses:
  MATTHEW AUGUSTUS SOUL,
  GEORGE POLLARD.